United States Patent
Holden

Patent Number: 6,134,218
Date of Patent: Oct. 17, 2000

[54] MANY DIMENSIONAL CONGESTION DETECTION SYSTEM AND METHOD

[75] Inventor: Brian D. Holden, Sunnyvale, Calif.

[73] Assignee: PMC-Sierra (Maryland), Inc., Burnaby, Canada

[21] Appl. No.: 08/970,882

[22] Filed: Nov. 14, 1997

Related U.S. Application Data

[63] Continuation-in-part of application No. 08/680,869, Jul. 16, 1996, which is a continuation of application No. 08/235,006, Apr. 28, 1994, Pat. No. 5,583,861.
[60] Provisional application No. 60/033,029, Dec. 12, 1996.

[51] Int. Cl.[7] ............................ G01R 31/08; H04L 12/28
[52] U.S. Cl. ........................ 370/232; 370/236; 370/414; 370/468
[58] Field of Search .................................. 370/412, 413, 370/414, 416, 418, 230, 231, 232, 235, 236, 468

[56] References Cited

U.S. PATENT DOCUMENTS

| | | | |
|---|---|---|---|
| 4,998,244 | 3/1991 | Lee et al. | 370/85 |
| 5,233,606 | 8/1993 | Pashan et al. | 370/418 |
| 5,381,410 | 1/1995 | Grenot | 370/60 |
| 5,396,494 | 3/1995 | Roposh | 370/85 |
| 5,539,747 | 7/1996 | Ito et al. | 370/60 |
| 5,570,358 | 10/1996 | Alatalo et al. | 370/60 |
| 5,787,071 | 7/1998 | Basso et al. | 370/231 |
| 5,978,380 | 11/1999 | Kobayashi et al. | 370/235 |

FOREIGN PATENT DOCUMENTS

| | | |
|---|---|---|
| 0 376 597 A2 | 4/1990 | European Pat. Off. |
| 0 624 015 A2 | 11/1994 | European Pat. Off. |

OTHER PUBLICATIONS

Bala et al., "Congestion Control for High Speed Packet Switched Networks," Ninth Annual Joint Conference of the IEEE Computer and Communications Societies, The Multiple Facets of Integration IEEE Infocom '90, San Francisco, Jun. 3–7, 1990.

Fan et al., "Expandable Atom Switch Architecture (XATOM) for ATM LANs," Serving Humanity Through Communications, Supercomm/ICC, New Orleans, May 1–5, 1994.

*Primary Examiner*—Chau Nguyen
*Assistant Examiner*—Phungchau Ba Nguyen
*Attorney, Agent, or Firm*—Townsend and Townsend and Crew LLP; Kenneth R. Allen

[57] ABSTRACT

A congestion detection system and method for an advanced ATM network measures congestion in a number of dimensions. In one embodiment, cell traffic is measured on a per virtual channel basis, per service class queue basis and a per device basis within an input routing table, and additionally on a per virtual output and per service class basis within an output routing table. In a specific embodiment, upon each measurement, cell traffic is compared to thresholds corresponding to that measurement's congested and maximum limit and a congestion or maximum signal is sent if that threshold is exceeded.

17 Claims, 4 Drawing Sheets

IRT CONGESTION MEASUREMENTS

ORT CONGESTION MEASUREMENTS

MANY DIMENSIONAL CONGESTION DETECTION SYSTEM AND METHOD

This application claims priority from provisional patent application 60/033,029 filed Dec. 12, 1996.

This application is a continuation-in-part of patent application Ser. No. 08/680,869, (16491-1-4) filed Jul. 16, 1996, which is a continuation of U.S. Ser. No. 08/235,006, now U.S. Pat. No. 5,583,861, filed Apr. 28, 1996 and which is incorporated herein by reference for all purposes.

BACKGROUND OF THE INVENTION

This invention relates primarily to a class of digital communication systems known as asynchronous transfer mode (ATM) switching systems and generally to intercomputer communications architectures. The invention more specifically relates to systems and methods for detecting data congestion within an ATM network.

A building block in a switch-fabric architecture ATM switch system is a structure known as a switch element. A switch element provides packet signal routing from one of a plurality of input ports to one or more of a plurality of output ports by maintaining an array of crosspoints for connecting any input port to any output port. Switch elements may be aggregated in various patterns to provide arbitrarily large N by N possible interconnection of input ports to output ports.

Problems arise where the receiving port cannot assimilate information as fast as it is delivered or where the priority of the traffic varies. A "brute-force" technique for handling the queuing problem is to provide sufficient data storage at each possible crosspoint in the switch element. If the amount of data accumulated at the crosspoint exceeds the capacity of the data storage, data is discarded, thus forcing the destination port to request that data be resent.

An alternative solution is discussed in detail in co-assigned U.S. Pat. No. 5,583,861 entitled ATM ARCHITECTURE AND SWITCHING ELEMENT. A difference in that ATM architecture over most prior systems is the use of a shared pool of memory for storing cells. A shared pool more effectively utilizes available memory.

Use of a shared pool of memory also creates an opportunity for more effective and sophisticated congestion management in an ATM architecture. Prior ATM systems generally measured congestion only crudely, either measuring congestion on just a physical device basis or according to just one or a few parameters in a device, such as priority. Some prior art systems attempted to infer congestion by examining traffic flow in particular channels of the network or did not measure congestion at all, but instead made a determination to discard buffered cells when shared buffers were full.

How an ATM network manages congestion is an important characteristic that affects overall performance. In general, it is desirable for an ATM switch to rarely drop a cell due to congestion. In order to achieve this, the network must be able to signal to transmitters that they must halt or slow down transmission when congestion begins to occur.

Congestion occurs when two cells are directed to the same output at the same time. In general, one of the cells will be stored temporarily in a buffer (or queue) associated with one of the ATM devices and will be output during a subsequent cell cycle. Congestion can also occur because stored cells at an intermediate resource in the ATM network, such as at a particular input routing table (IRT) or output routing table (ORT), exceeds the physical memory (buffer) storage capacity of that device.

Prior Art References

U.S. Pat. No. 5,280,470 (Buhrke), filed Feb. 3, 1993, priority Nov. 21, 1990, as a further example, describes a congestion management in broadband ISDN cell networks where overload is detected in a network switch and then a routine is performed to determine which virtual channels to slow down (FIG. 4) in order to relieve congestion. Buhrke does not monitor congestion in a particular virtual channel, but instead infers congestion by monitoring transmission rates. Buhrke does not monitor congestion in several dimensions on an ongoing basis.

U.S. Pat. No. 5,233,606 (Pashan), filed Aug. 2, 1991, discusses controlling shared-buffer-memory overflow in a multipriority environment that does not measure congestion at all but instead waits until all buffer memories are used up and then determines from which memory a cell should be flushed. (See, for example, the abstract, "It initially allows output-port queues to completely consume the buffer memory. Thereafter, when an additional incoming cell is received for which there is no room in the buffer memory, the lengths of all of the queues of each output port are individually summed and compared to determine which port has the greatest number of buffered cells. A buffered ATM cell is discarded from the lowest priority non-empty queue of that port." Pashan teaches away from actually measuring congestion in that, instead of measuring congestion, Pashan allows a buffer to fill up and then discards cells from that buffer.

U.S. Pat. No. 5,313,454 (Bustini), filed Apr. 1, 1992, for example, describes a congestion control for cell networks where congestion is monitored by measuring queue lengths at network nodes. Because congestion is monitored in only one dimension at a particular buffer pool memory, the congestion detection threshold must be set very low as compared with the possible capacity of the buffers. For example, the patent states, "The PQth threshold is normally set at four kilobytes, a fraction of the 64 kilobyte queue capacity." 13:52–54.

U.S. Pat. No. 5,367,520 (Cordell), filed Nov. 25, 1992, discusses a multiple plane switch fabric. A number of problems must be solved in order to efficiently and correctly transmit data from multiple sources to multiple destinations across such a multiple plane fabric. FIG. 5 of the '520 patent illustrates a mechanism for handling two of these problems: (1) spreading cells out over multiple planes in the switch fabric, and (2) maintaining cells in order through the switch fabric so that if stream of cells 1–10 are queued to a particular destination A, cell A1 is always delivered before cell A2. The backpressure feedback is discussed at 16:31 et seq. The discussed scheme is limited to measuring congestion in the output buffers only. The reference states that "In practice, however, it is probably satisfactory to make all cells destined to that queue's entire Output Buffer Group of 16 queues wait, resulting in a brief 0.2% reduction in switch throughput." (16:52–55)

U.S. Pat. No. 5.359,592 (Corbalis), filed Jun. 25, 1993, describes a congestion control in an ATM device where cell counts are kept on a per cell queue basis only, and these counts are compared to up to three different thresholds. Though Corbalis sets many different threshold levels, levels are set in only one dimension.

Cooper, C. A. and Park, K. I. (Cooper), "Toward a Broadband Congestion Control Strategy," I.E.E.E. Network Magazine, May 1990, is a survey article that discusses a possibility of congestion control strategies where ATM cells may be processed in accordance with multilevel priorities. Traffic Characterization, Admission Control, and Policing are discussed. A strategy of many-dimensional congestion measuring in a shared buffer is not discussed.

Oshima, K. et al, (Oshima), "A New Switch Architecture Based on STS-Type Shared Buffering and its LST Implementation," XIV International Switching Symposium, Yokohama, Japan, October 1992 discusses an ATM architecture with a partially shared buffer that does not discuss congestion measurement in shared buffers.

Badran, H. F. and Mouftah, H. T. (Badran I), "Head of Line Arbitration in ATM Switcher with Input-Output Buffering and Backpressure Control," GLOBECOM '91, I.E.E.E., discuss a backpressure mechanism that uses two queue specific criteria (queue length and input-queue age) and two cell-specific criteria (time of joining input queues and time of arrival to the head-of-line position) to resolve head-of-line contention.

Badran, H. F. and Mouftah, H. T. (Badran II), "Input-Output-Buffered ATM Switches with Delayed Backpressure Mechanisms," CCECE/CCGEI '93, I.E.E.E., discuss a delayed backpressure feedback mechanism that sets two levels (Level1 and Level2) for measuring congestion on one dimension of the output queue only (see FIG. 1).

More sophisticated and finer congestion management on multiple dimensions would be desirable in a shared memory system because when congestion is measured and monitored at finer levels of detail, the system can allow individual types of traffic to use more of the shared resources while still ensuring that sufficient resources will be available to provide guaranteed service to higher priority traffic. However, increased levels of congestion detection and management require increased circuit and processing overhead and could reduce processing speed.

Increasing demands for communications speed and capacity have created a need for higher performance ATM architectures as described in U.S. Ser. No. 60/033,029. This architecture differs from the architecture in the parent patent applications in that the primary shared memory areas are associated with an input routing table (IRT) and output routing table (ORT). Shared buffer memory associated with individual switch elements are generally used only when handling multicast traffic. The architecture is different also in that it provides for a number of virtual outputs (VOs) for each physical output from an ORT and virtual inputs (VIs) for each physical input to an IRT. In one specific embodiment, the ORT and IRT are combined into a single device referred to as a Quad Routing Table (QRT). The QRT may be used in connection with a switch fabric constructed of switch elements (SEs) as described in the parent applications or may be used in connection with a switch fabric made up of update quad switch elements (QSEs) described in U.S. Ser. No. 60/033,029.

What is needed is a congestion management scheme for an ATM architecture having substantial shared resources that allows effective use of system resources while able to guarantee service to certain traffic classes.

SUMMARY OF THE INVENTION

A congestion detection system and method for advanced ATM networks measures congestion according to a sufficient number of dimensions that shared resources may be heavily utilized by existing cell traffic while guaranteeing sufficient capacity remains to service high priority traffic. Congestion management actions may be configured and taken according to congestion detected in any dimension or in aggregates of dimensions.

Prior art ATM systems that measure congestion do so in only one or a very few dimensions in order to reduce overhead and to attempt to speed processing of ATM cells. While measuring congestion in a number of dimensions and taking congestion actions in more than one dimension might be thought to be inefficient in terms of system resources, the invention achieves the surprising result of providing greater system efficiency and performance by measuring congestion according to multiple dimensions. The invention does this by allowing the network to provide guaranteed service to certain types of cell traffic (e.g. to certain virtual channels or service classes) while allowing larger congestion thresholds for the individual congestion points measured.

This may be understood by considering an example of an ATM network where 100 units of a resource are available for "high priority" traffic and where that traffic can be on any one of 10 virtual channels. Assume further that the maximum traffic that can be carried on any one virtual channel is 50 units of resource. Assume further that acceptable system performance can be guaranteed only if congestion management actions are taken whenever 80% of available resources for either a given virtual channel or a given priority were being used.

In this situation, if congestion were measured only on a per virtual channel basis, a congestion threshold would have to be set at 8 units per virtual channel to ensure that congestion management actions were timely taken in the case where all ten possible virtual channels had 8 units each.

If congestion were measured only by priority, a congestion threshold of 40 would have to be set for high priority traffic to ensure that management actions were timely taken when 40 high priority cells were in one virtual channel. By measuring congestion independently in both dimensions, a threshold of 80 for high priority traffic and 40 for a particular VC can be maintained and timely congestion management can still be guaranteed. Therefore the invention, even though it may require additional overhead circuitry and processing to track congestion in various dimensions, has the result of enhancing overall network performance by allowing greater utilization of shared resources.

Embodiment According to U.S. Pat. No. 5,570,348

In the embodiment of the invention described in the parent applications, ATM congestion may be understood as measured and congestion thresholds set in three dimensions: (1) per virtual channel (or connection); (2) per priority; and (3) per device. A marked interrupt linked list is one mechanism used to alert a processor to the existence of various congestions in the '861 architecture. Some of these congestion measurements are made in each switch element of the switch fabric and backpressure signals are sent through the fabric to previous transmitters to slow down transmission. Congestion measurements are also made in routing tables as described in the parent application.

Embodiment in a Newer ATM Architecture

In a new ATM architecture, as described in U.S. Ser. No. 60/033,029, more detailed congestion management is desirable. One reason for this is that in the new architecture, a single ORT has a physical output which may carry traffic for up to 31 virtual outputs (VOs). It is desirable for congestion caused by one VO not to affect other VOs. Furthermore, because substantial buffering of cells takes place in the IRT and the ORT, it is desirable to measure congestion independently in both of those devices.

In a specific embodiment for an improved ATM switch architecture, congestion is measured in five dimensions within an ORT and in three dimensions within an IRT. In a specific embodiment, within an IRT, cell traffic congestion is measured (1) on a per virtual channel (VC) basis, (2) per service class (SC) basis, or (3) a per device basis. In a specific embodiment, within an ORT, cell traffic congestion is measured (1) per VC, (2) per SC, (3) per device, (4) per virtual output (VO), and (5) per service class on a particular VO (referred to as per service class queue (SCQ)).

According to one embodiment, counters are maintained for the dimensions in an IRT and an ORT. Each time a cell enters and is queued for transmission through either an IRT or ORT, appropriate counters in those devices are incremented. Each time a cell leaves either an IRT or ORT, the appropriate counters in those devices are decremented.

Counter values are compared to at least one threshold for that count value. If a threshold is equalled or exceeded, appropriate congestion management action is taken. In one embodiment, more than one preset threshold is set for a counter, with an initial threshold signalling that one type of congestion management action must be taken and a different threshold signalling another management action must be taken.

In a specific embodiment, numerous count values may be maintained in a particular dimension, such as a separate count value for each of up to 16,384 (16K) VCs defined in an IRT or ORT. In such a case, a current count value is stored in a memory along with configuration information for a particular VC, and when a cell is processed for that VC the corresponding count value is loaded into the counter and incremented or decremented as appropriate. In a further embodiment, separate threshold values may be established for each VC, and these are also stored in memory and loaded when a cell for a particular VC is processed.

In one embodiment, a congestion manager, located in the IRT and ORT, aggregates the different count values from different components in an ATM switch and takes overall congestion management actions as appropriate.

In a further embodiment, QSEs during one mode of non-multicast operation operate without any buffering of cells within the QSE, unlike the SE described in the parent application. Therefore, QSEs do not measure congestion within their cell buffer memories. However, in an embodiment, QSEs are enabled to operate in a different mode where they do activate an internal cell buffer. In that case, congestion detecting also takes place separately within an QSE as discussed in the parent application. This additional mode may be activated to allow a new QSE to operate in a backwards compatible fashion and also may be activated during multicast cell transmission.

The invention will be further understood with reference to the drawings of specific embodiments described below.

DETAILED DESCRIPTION OF THE DRAWINGS

The parent applications discussed a congestion management system that provided the advantages of many-dimensional congestion management according to the ATM architecture described therein.

Figure 1:
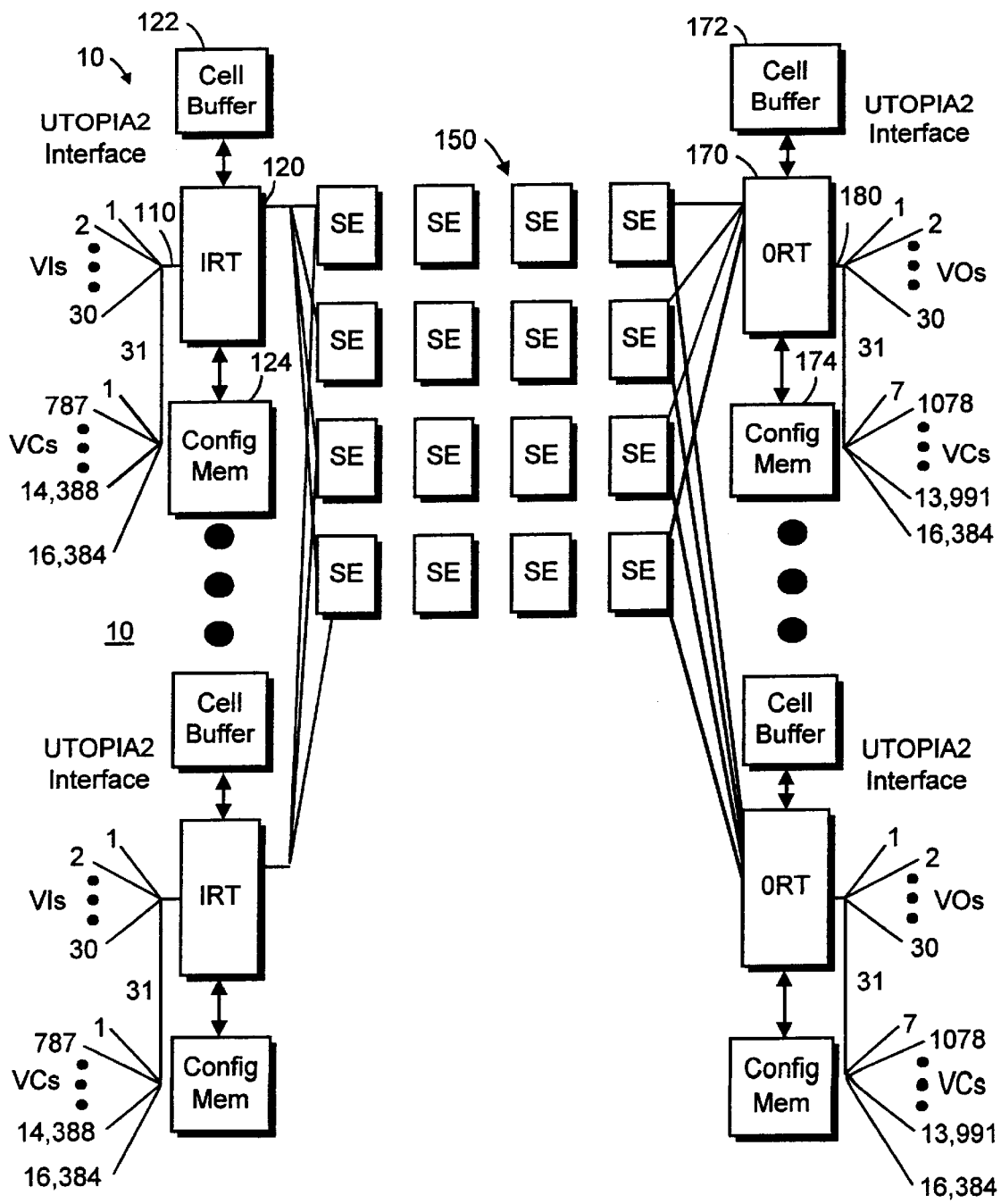
FIG. 1 is a block diagram of one type of ATM network in which the present invention may be employed.

FIG. 1 shows a representation of an ATM network 10 as a further example of an ATM architecture, this one having virtual outputs, in which the invention may be employed. ATM network 10 as illustrated contains input transmission line 110, input routing tables (IRTs) 120, a N×N switch matrix 150, output routing tables (ORTs) 170, and output transmission lines 180. Associated with IRT 120 is cell buffer memory 122 and configuration memory 124. Associated with ORT 170 is cell buffer memory 172 and configuration memory 174.

ATM cells, which are digitized packets corresponding to a voice or video signal or a data stream, are sent through an input transmission line 110 into a connecting IRT 120. The IRT 120 ascertains the cell's routing and determines an entry point into the switch matrix path, based on a particular algorithm, including a random-entry algorithm.

Cells are arranged in queues within a buffer memory 122 associated with IRT 120 and are then transmitted through the switch matrix 150. Upon exiting the switch matrix, a cell is sent to one (or possibly more than one in the case of multicast cells) of the N ORTs corresponding to the cell's destination address. Within the ORT 170, received cells are queued in a plurality of queues in cell buffer 172 and subsequently transmitted onto a connecting output transmission line 180. In this manner, an ATM network can route audio, video or data signals, each requiring different bandwidth and transmission speeds.

In order to manage cells flowing through an ATM network, cells are grouped into virtual channels (VCs). A VC can be thought of as a sequential stream of cells flowing from a source to a destination, generally representing a single connection such as a single telephone call. The channel is referred to as a virtual channel because there is not generally a dedicated path within the ATM switch from the source to the destination; the actual path may vary from transmission to transmission, or even during transmission, depending upon the type of traffic sent, whether congestion occurs, or other factors.

In the specific embodiment shown, each input transmission line can carry cells from a plurality of virtual inputs (VIs), which number 31 in a specific embodiment. The ATM switch can keep track of 16K VCs and a particular VC can occur on any VI. At its simplest, a VC is a stream of cells travelling from a particular VI to a particular VO and having a particular transmission priority.

In many ATM switches, cells or VCs are assigned a service class (SC) (sometimes referred to as a priority). The SC defines certain handling within the ATM switch, such as priority of throughput or the amount of available bandwidth that a particular VC is allowed to occupy.

In advanced ATM networks, cells may also be grouped according to VOs. Supporting VOs allows the cell to be routed to different physical receivers out of the same ORT output line, with data multiplexed to the different output receivers by a device outside of the ORT.

Figure 2:
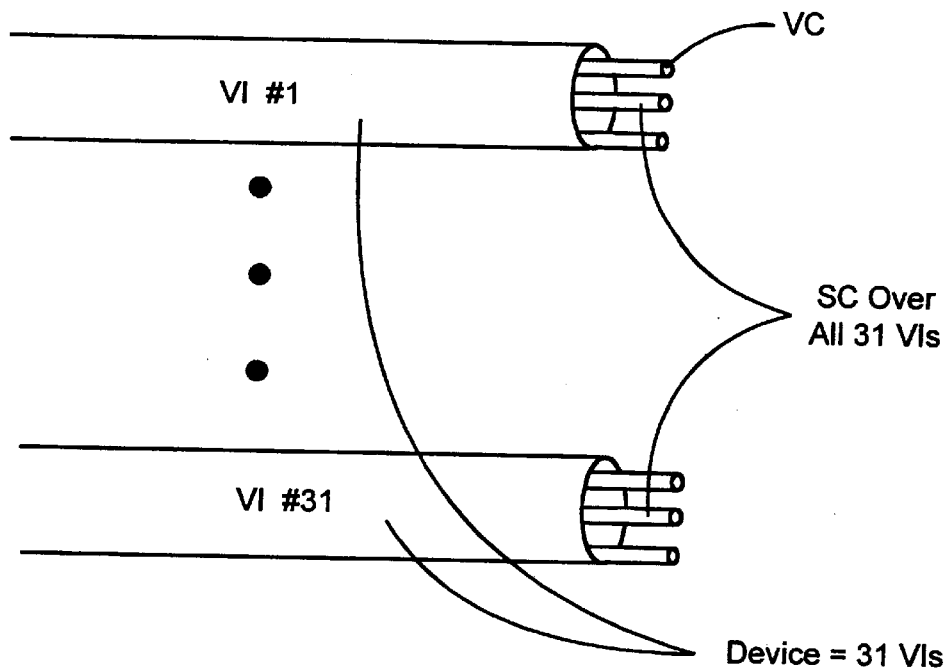
FIG. 2 is a representation of cell traffic flow in an IRT and an ORT showing the congestion measurements in each according to one specific embodiment of the invention.
Figure 2:
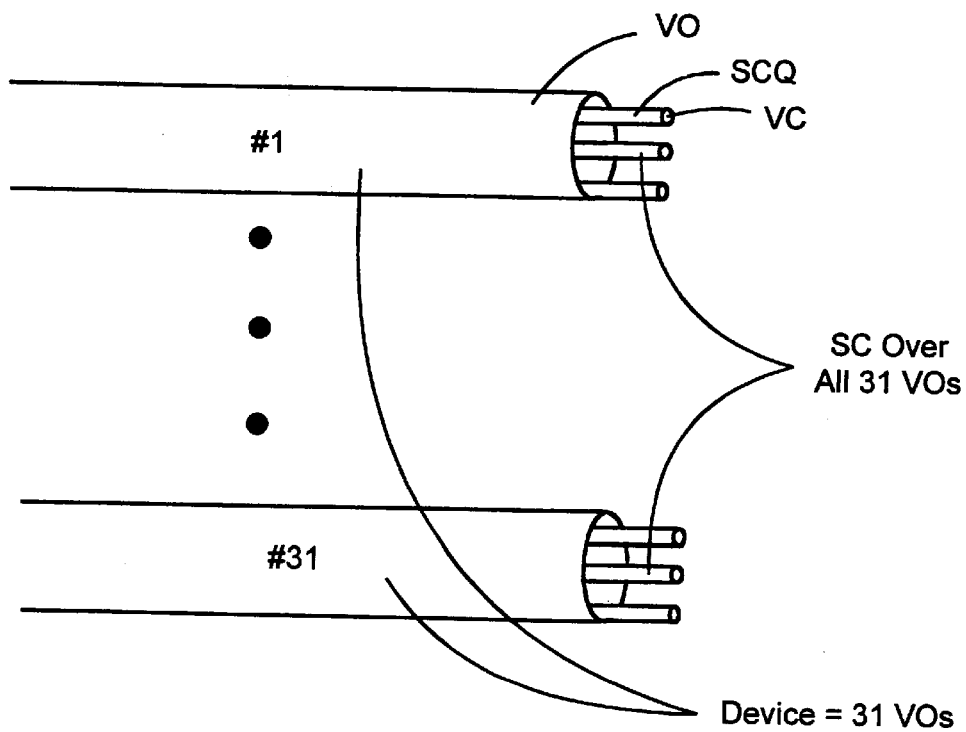

FIG. 2 illustrates in a general way the different dimensions for which congestion counts are maintained according to a specific embodiment of the invention.

Figure 3:
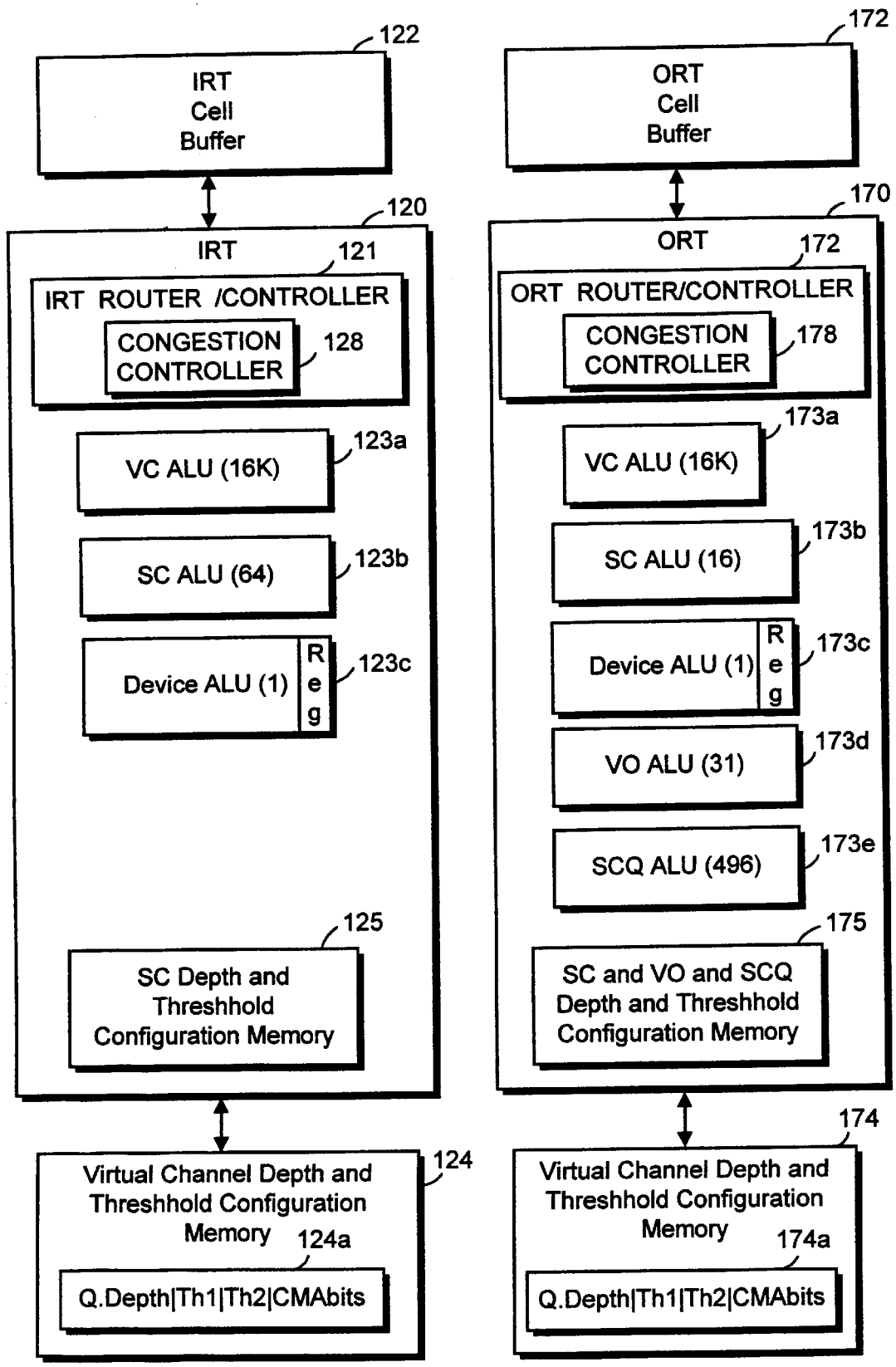
FIG. 3 is a block diagram of an IRT and ORT showing multiple congestion counters ALUs according to one embodiment of the invention.

FIG. 3 shows an example of an IRT 120 and ORT 170 each containing congestion counters. In order to perform congestion detection, cell counters are placed within components in the ATM switch. IRT 120 has counters for VC count, SC count, and device count. ORT 170 has counters for VC count, SC count, device counts, VO counts, and SCQ counts. These cell counters are incremented each time a cell of the appropriate type enters a counter's associated component, device, or buffer, and decremented each time an appropriate cell exits a counter's associated component, device, or buffer.

It will be understood that counters may be implemented in a variety of ways. One mechanism for implementing counters is for the counters to exist as dedicated or general-purpose memory locations that are loaded with a count value from a data structure each time a cell is processed and then are incremented or decremented as appropriate. A configuration data structure for each VC according to one embodiment is stored in memory 124, which, because of the size necessary to store data structures for 16K virtual channels, may be located in external memory. Data structures are also maintained for each SC, VO, and SCQ. In one embodiment, these data structures are maintained in internal memory 125 and 175, as shown, in order to be more quickly accessible.

Figure 4:
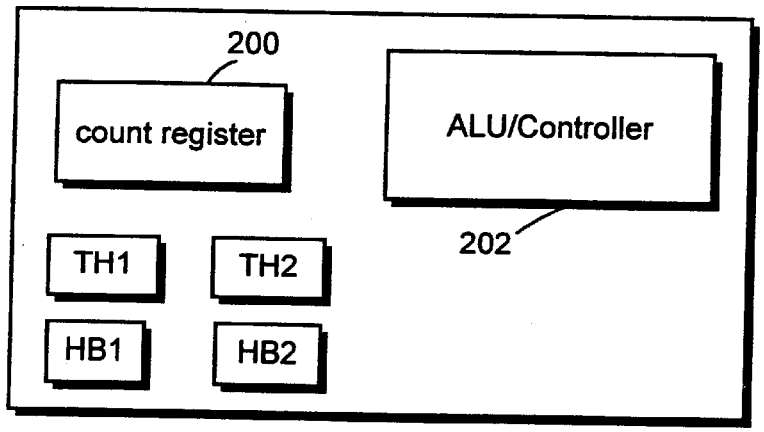
FIG. 4 is a block diagram showing one counter/ALU as an example of a counter circuit according to the invention.
Figure 5:
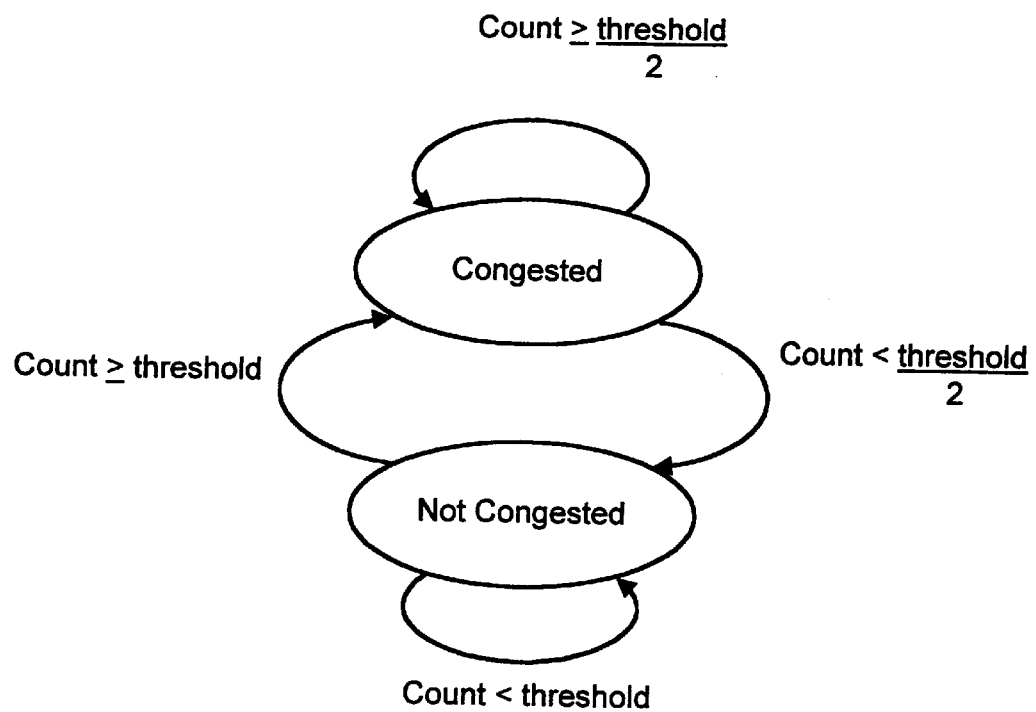
FIG. 5 is a state diagram showing congestion management hysteresis according to one embodiment of the invention.

According to one embodiment, each cell counter may be constructed as a separate arithmetic/logic unit (ALU) for independently incrementing or decrementing its count value and independently comparing that value to loaded thresholds so as to speed processing of a cell. FIG. 4 shows one example of details of an ALU and is described in more detail below. It should be understood that depending on overall configuration, count values may remain in an ALU for extended period and not need to be loaded from memory. Count values for a device, for example, might remain always loaded in their respective ALU. Alternatively, count values could be loaded into a register and incremented and compared by a central processing unit.

According to the invention, the finest detail of cell traffic measured is the number of cells pending in a particular VC. In a specific embodiment, both the IRT and ORT contain VC counter 123a and 173a and count values, stored in external memory, for each VC established in the routing tables. There can be up to 16K different VC count values maintained in the IRT and 16K maintained in the ORT. When a cell is handled in either device for a particular VC, the VC count value for that VC (i.e., the number of pending cells stored in the device for that VC) is loaded from memory into the VC counter and the value is incremented or decremented as appropriate; compared to threshold values, and then placed back into memory after any necessary congestion management actions are signalled. According to one embodiment, threshold values for each VC are also loaded from a memory into the counter ALU to perform the compare. According to one embodiment, for each virtual channel there is an entry such as 124a specifying the queue depth, at least one threshold value (Th1, Th2), and additional configuration management action bits that can specify appropriate congestion management action for a virtual channel.

The next finest detail of congestion that is measured in both the IRT and the ORT in one specific embodiment is per service class (SC) in counters 123b and 173b. Each VC in the ATM network is assigned a service class. In one embodiment, there can be up to 64 different SC count values maintained in the IRT and 16 in the ORT, with each ORT SC mapped to four IRT SCs. When a cell is handled in either device for a particular VC, the SC count value for that VC is loaded from memory into the SC counter and the value is incremented or decremented as appropriate along with the VC count. The SC count value is then compared to threshold values for that SC.

The final level of detail of cell traffic measured in both the IRT and the ORT in one specific embodiment is per device (i.e., per a single IRT or ORT) in counters 123c and 173c. When a cell is handled in either device the device counter for that device is incremented or decremented as appropriate along with the other counts and is then compared to threshold values for that device.

In the ORT, congestion is measured at two additional levels of detail. One is per VO. In one specific embodiment, the number of VOs per physical output is 31. Each VC is directed to one VO (except for multicast VCs, which are directed to a finite and known number of VOs), so that the 16K available VC's are distributed among the 31 VOs. When a cell is handled in the ORT, the VO count value for that cell is loaded from memory into the VO counter 173d and the value is incremented or decremented as appropriate along with the other counts. The VO count value is then compared to threshold values for that VO.

In the ORT, congestion is additionally measured per service class per VO, referred to as a service class queue (SCQ). In one specific embodiment, the number of VOs per physical output is 31 and the number of possible SCs in the ORT is 16, so the number of SCQ counts is 496. When a cell is handled in the ORT, the SCQ count value for that cell is loaded from memory into the SCQ counter 173e and the value is incremented or decremented as appropriate along with the VO count and other counts. The SCQ count value is then compared to threshold values for that SCQ.

The embodiment shown in FIG. 3 provides a further advantage that it is possible to include congestion counts and management in even more dimensions without impacting RT performance because of the parallel nature of the ALUs. In some applications, for example, it may be desirable to include congestion counts and thresholds for the lowest four SCs (which might be referred to as service-class-group-lowest-four (SCGL4), for the lowest eight SCs (SCGL8), and for the lowest twelve SCs(SCGL12). This can be accomplished by providing additional ALUs, such as ALU 173a–e. Some of these ALUs might include a dedicated register, such as ALU 173c, for counts that have a single value that applies to the entire ORT and others might include a register that is loaded from a configuration memory. Because these ALUs operate in parallel, additional dimensions of congestion counts may be kept without impacting the speed of cell processing.

It should also be understood that in an embodiment, for some or all of ALUs 123a–c or 173a–e shown, there will actually be two ALU circuits, one for performing calculations as a cell is entering a queue or buffer (enqueue) and the second for performing calculations as a cell is leaving a queue or buffer (dequeue).

FIG. 4 shows one example of the details of a counter/ALU for performing operations associated with monitoring congestion containing a count register 200 for holding a count value, registers TH1 and TH2 for holding threshold values, hysteresis bit (HB) registers HB1 and HB2, described below, for holding an HB value, and an ALU/controller 202 for performing the increment/decrement on the count register, comparisons to TH1 and TH2, checking of the HB and signalling to a congestion controller. It will be understood that in a common embodiment, each of these values will be loaded from a memory data structure associated with a particular VC, VO, SC, or SCQ as a cell is processed and the computations performed.

According to one embodiment, the value in each cell counter is compared to two thresholds applicable to that count. If the count exceeds the preset congestion threshold, a VC congestion signal is transmitted to a congestion monitor. If the count exceeds the maximum threshold, a maximum limit signal is transmitted to a congestion monitor.

Congestion controllers 128 or 178, shown in FIG. 3, may receive congestion signals resulting from any of the aforementioned measurements in their respective IRT or ORT. In one embodiment, a congestion monitor may function as an OR gate which initiates a congestion management protocol when any one or more of the measurements result in a threshold being exceeded. A further embodiment is a congestion monitor which indicates which of the types of traffic is being congested within the IRT or ORT so that the congestion management protocol can identify where the congestion occurs and how it might be circumvented.

Congestion Management Actions

When congestion is detected, congestion management actions are taken in accordance with various embodiments of the invention. These actions are, for the most part, as is known in the art and defined by various ATM standards. In one embodiment of the invention, the choice of congestion management actions is selected on a per VC basis and is stored along with a VC configuration data structure in memories 174 and 124. Congestion management may also be selected on a per SC basis or according to other configured criteria. Possible congestion management actions include:

Cell Loss Priority (CLP) Marked Cell Dropping

When this action is configured, a bit in the header of a cell indicates whether that cell is low priority or high priority (independent of SC). Low priority cells are dropped when congestion levels are reached.

Early Packet Discard

When this action is configured, frames contained within a sequence of cells are found and dropped when congestion is detected. This may be done in accordance with various methods known in the prior art. Frames are detected by monitoring the header of the cells.

Random Early Discard

When this action is configured, the probability of frame discard is determined in relation to the depth of the queues.

Explicit Forward Congestion Indication (EFCI) Marking

When this action is configured, the EFCI codepoint in the cell header is marked, this will cause the cell rate for this channel to be lowered through the action of the ATM Forum ABR protocol.

Congestion Indication (CI) Marking

When this action is configured, the CI bit in the reverse direction Resource Management (RM) cells is set. This will cause the cell rate for this channel to be lowered through the action of the ATM Forum ABR protocol.

Explicit Rate Signaling

When this action is configured, the ATM Switch will indicate to the source the rate to send by setting the Explicit Rate (ER) value in backwards RM cells.

Expression of Threshold by an Exponent

In one embodiment, threshold values are expressed and stored as the exponent of the power of two. This allows an efficient and compact implementation and storage of threshold values. A variation on this embodiment adds one or more bits of mantissa stored in the threshold to add to the resolution.

Hysteresis on the Congested State

In one embodiment, for each threshold, a state bit is kept which allows a hysteresis function to be implemented as shown in FIGS. This allows a congestion management action to be taken for an extended period until the congestion is substantially relieved. In a specific embodiment, congestion management actions appropriate to a particular threshold are taken until the cell count value falls below ½ of the threshold value.

The invention has now been explained in accordance with specific embodiments, however many variations will be obvious to those skilled in the art. The invention should therefore not be limited except as provided in the attached claims.

What is claimed is:

1. A method for detecting congestion within an ATM device, the device having at least one buffer pool, a plurality of service classes and a plurality of virtual channels, the method comprising:

counting the number of cells in a buffer in a virtual channel and determining a virtual channel count;

comparing said virtual channel count to a virtual channel count threshold;

generating a virtual channel congestion signal if indicated by said virtual channel compare;

determining a service class count by counting the number of cells in a buffer within a service class;

comparing said service class count to a preset service class threshold;

generating a service class congestion signal if indicated by said service class compare;

determining a number of available cell buffers remaining in a buffer pool as a device count;

comparing said device count to a preset device threshold;

generating a device congestion signal if indicated by said device count compare; and receiving any generated congestion signals and initiating one or more congestion management actions if one or more of said congestion signals is received.

2. The method according to claim 1 further comprising:

counting the number of cells in a buffer for a virtual output and determining a virtual output count;

comparing said virtual output count to a virtual output count threshold; and generating a virtual output congestion signal if indicated by said virtual output compare.

3. The method according to claim 2 further comprising:

determining a service class queue count by counting the number of cells in a service class queue;

comparing said service class queue count to a service class queue threshold; and generating a service class queue congestion signal if said service class queue count exceeds said service class queue threshold.

4. The method according to claim 1 wherein for each threshold two threshold values are stored, the first being an initial threshold and the second being a maximum threshold.

5. The method according to claim 4 wherein when an initial threshold value is exceeded, a congestion management action is taken according to that threshold.

6. The method according to claim 4 wherein when a maximum threshold value is exceeded, cells are dropped unconditionally.

7. The method according to claim 1 wherein a threshold value is stored as a power of two.

8. The method according to claim 1 wherein a threshold value is stored as a power of two and at least one bit of mantissa to add to the resolution of the stored threshold value.

9. The method according to claim 1 wherein said one or more congestion management actions can be one or more actions from the set consisting of:

Cell Loss Priority Marked Cell Dropping, Early Packet Discard, Random Early Discard, Explicit Forward Congestion Indication Marking, Congestion Indication Marking, and Explicit Rate Signaling.

10. The method according to claim 9 wherein a choice of congestion management actions is selected on a per virtual channel basis.

11. The method according to claim 1 wherein for at least one stored threshold, a state bit is kept to allow a hysteresis function to be implemented so that a congestion management action can be taken for an extended period until congestion is relieved.

12. An ATM device capable of detecting congestion in a plurality of dimensions comprising:

a cell buffer;

an input line for receiving ATM cells;

an output line for outputting ATM cells;

a controller for receiving congestion indications;

a virtual channel counter and a virtual channel count threshold;

a service class counter and a service class counter threshold;

a device counter and a device counter threshold;

a comparator for comparing a value in one of said counters to its corresponding threshold and generating a congestion indication; and a configuration memory.

13. The device according to claim 12 further comprising a service class queue counter and a service class queue counter threshold.

14. The device according to claim 12 further comprising a service class group counter and a service class group threshold.

15. The device according to claim 12 wherein count values and threshold values are stored in said configuration memory and loaded into said counters for the processing of a cell.

16. The device according to claim 12 wherein said counters are incorporated into independent arithmetic logic units, each able to simultaneously perform a count decrement or increment and threshold compare during processing of a cell.

17. The device according to claim 12 further comprising a virtual channel configuration entry containing a queue depth value for a virtual channel, at least one threshold value, and at least one congestion management action bit indicating appropriate congestion management action for a virtual channel.

* * * * *